US012590175B2

(12) United States Patent
Zhou et al.

(10) Patent No.: US 12,590,175 B2
(45) Date of Patent: Mar. 31, 2026

(54) HYDROPHILIC POLYMER, METHOD OF PREPARING THE SAME, AND LITHIUM SECONDARY BATTERY CONTAINING THE HYDROPHILIC POLYMER

(71) Applicant: CONTEMPORARY AMPEREX TECHNOLOGY (HONG KONG) LIMITED, Hong Kong (CN)

(72) Inventors: Xin Zhou, Ningde (CN); Shaohua Ai, Ningde (CN); Yuxi Zhang, Ningde (CN); Qi Zeng, Ningde (CN); Yu Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 236 days.

(21) Appl. No.: 18/649,960

(22) Filed: Apr. 29, 2024

(65) Prior Publication Data

US 2024/0287226 A1 Aug. 29, 2024

Related U.S. Application Data

(63) Continuation of application No. PCT/CN2022/098915, filed on Jun. 15, 2022.

(51) Int. Cl.
*C08F 212/08* (2006.01)
*C08F 212/14* (2006.01)
(Continued)

(52) U.S. Cl.
CPC .......... *C08F 212/08* (2013.01); *C08F 212/18* (2020.02); *C08F 212/22* (2020.02);
(Continued)

(58) Field of Classification Search
None
See application file for complete search history.

(56) References Cited

U.S. PATENT DOCUMENTS 4,158,098 A * 6/1979 Trepka .................. C08F 236/10 568/643
6,306,555 B1 * 10/2001 Schulz .................... G03F 7/038 522/31

FOREIGN PATENT DOCUMENTS

CN 106221596 A 12/2016
CN 111699579 A 9/2020
(Continued)

OTHER PUBLICATIONS

English Translation of CN_113174010_A (Year: 2021).*
(Continued)

*Primary Examiner* — Niki Bakhtiari
*Assistant Examiner* — Dustin Van Kirk
(74) *Attorney, Agent, or Firm* — K&L Gates LLP

(57) ABSTRACT

The present disclosure relates to a hydrophilic polymer and a method for preparing the same. The hydrophilic polymer is characterized in that it is a copolymer of a conjugated diene, a monoolefin and a hydrophilic monomer represented by Formula I. In the Formula I, $X_1$, $X_2$ and $X_3$ are each independently selected from hydrogen atoms, or a linear or branched alkyl with 1-4 carbon atoms. At least one of $R_1$, $R_2$ and $R_3$ is hydrophilic group; and the others are each independently selected from hydrogen atoms or, an alkyl or alkoxy with 1-4 carbon atoms.
(Continued)

5

Formula I

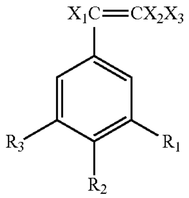

16 Claims, 2 Drawing Sheets

(51) Int. Cl.

| | |
|---|---|
| ***C08F 212/32*** | (2006.01) |
| ***C08F 214/06*** | (2006.01) |
| ***C08F 218/08*** | (2006.01) |
| ***C08F 220/06*** | (2006.01) |
| ***C08F 220/18*** | (2006.01) |
| ***C08F 220/44*** | (2006.01) |
| ***C09D 125/10*** | (2006.01) |
| ***H01M 4/02*** | (2006.01) |
| ***H01M 4/62*** | (2006.01) |
| ***H01M 10/0525*** | (2010.01) |

(52) U.S. Cl.

CPC .......... *C08F 212/32* (2013.01); *C08F 214/06* (2013.01); *C08F 218/08* (2013.01); *C08F 220/06* (2013.01); *C08F 220/1804* (2020.02); *C08F 220/44* (2013.01); *C09D 125/10* (2013.01); *H01M 4/02* (2013.01); *H01M 4/622* (2013.01); *H01M 10/0525* (2013.01); *H01M 2004/027* (2013.01); *Y02E 60/10* (2013.01)

(56) References Cited

FOREIGN PATENT DOCUMENTS

| | | | | | |
|---|---|---|---|---|---|
| CN | 113174010 A | * | 7/2021 | ............ C08F 236/10 |
| JP | S5013484 A | | 2/1975 | |
| JP | H06256605 A | | 9/1994 | |
| JP | 2011063714 A | * | 3/2011 | |
| JP | 2011108373 A | | 6/2011 | |
| JP | 2021116360 A | | 8/2021 | |
| KR | 101366217 B1 | * | 2/2014 | ............. B32B 15/08 |
| WO | 2020226035 A1 | | 11/2020 | |
| WO | WO-2022114199 A1 | * | 6/2022 | .............. H01M 4/62 |
| WO | 2022230468 A1 | | 11/2022 | |

OTHER PUBLICATIONS

English Translation of JP_2011063714_A (Year: 2011).*
English Translation of KR_101366217_B1 (Year: 2014).*
English Translation of WO_2022114199_A1 (Year: 2022).*
International Search Report received in the corresponding International Application PCT/CN2022/098915, mailed Mar. 15, 2023.
Written Opinion received in the corresponding International Application PCT/CN2022/098915, mailed Mar. 15, 2023.
Notice of Allowance (with English Machine Translation), mailed Aug. 5, 2025, for corresponding Japanese Patent Application Serial No. 2024-505344.
Office Action (with English Machine Translation), mailed Aug. 20, 2025, for corresponding Korean Patent Application Serial No. 10-2023-7034979.
The extended European search report received in the counterpart EP application 2298762.6, mailed on Jun. 5, 2025, 9 pages.
The Notice of Reasons for Rejection received in the counterpart JP application 2024-505344, mailed on Mar. 11, 2025, 8 pages with English translation.

* cited by examiner

HYDROPHILIC POLYMER, METHOD OF PREPARING THE SAME, AND LITHIUM SECONDARY BATTERY CONTAINING THE HYDROPHILIC POLYMER

CROSS-REFERENCES TO RELATED APPLICATIONS

The present application is a continuation of International Patent Application No. PCT/CN2022/098915, filed on Jun. 15, 2022, the contents of which are incorporated herein by reference.

FIELD

The present disclosure relates to the technical field of lithium batteries, and more particularly, to a hydrophilic polymer used for a binder, a method for preparing the same, and a lithium ion secondary battery containing the hydrophilic polymer.

BACKGROUND OF THE INVENTION

With the rapid development of new energy vehicles, smart phones, consumer electronics and other industries, the market demand for lithium ion batteries is increasing, and higher requirements for the binder used to prepare the electrodes are also put forward.

In the past, in lithium ion batteries, polyvinylidene fluoride (PVDF) has been widely used as a binder material due to its high dielectric constant and strong corrosion resistance. However, since polyvinylidene fluoride has low bonding strength and poor high-temperature electrochemical stability, it is difficult to provide stable cycle performance. When polyvinylidene fluoride is used as a binder material, an organic dispersion medium such as N-NMP is usually used as a dispersant, which has disadvantages of being flammable, explosive, volatile, and toxic, and of high recovery cost. Therefore, it is very important to develop a novel water-based binder with excellent processability and adhesive property.

BRIEF SUMMARY OF THE INVENTION

The present inventors conducted in-depth studies to solve the above problems, and found that by copolymerizing a conjugated diene, a monoolefin, and a hydrophilic monomer having a structure represented by the following formula I, a binder having a high adhesive force and exhibiting almost no floating and roll sticking problems can be obtained, thereby the present disclosure has been accomplished.

That is, the present disclosure relates to a hydrophilic polymer obtained by copolymerizing a conjugated diene, a monoolefin and a hydrophilic monomer having the structure represented by Formula I below;

Formula I

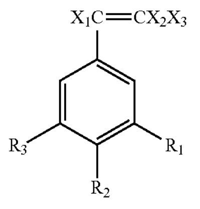

where $X_1$, $X_2$, and $X_3$ are each independently selected from hydrogen atom, or a linear or branched alkyl with 1-4 carbon atoms; $R_1$, $R_2$, and $R_3$ are each independently, at least one of which represents the same or different hydrophilic groups, and the others of which represent hydrogen atoms or, a linear or branched alkyl or alkoxy with 1-4 carbon atoms. Thus, it is possible to provide a hydrophilic monomer-modified copolymer having improved hydrophilicity and adhesiveness, improved affinity with graphite and the like, and improved floating and roll sticking problems of the binder.

In a preferred embodiment of the hydrophilic polymer of the present disclosure, the hydrophilic polymer is a random copolymer; the conjugated diene is one or more of 1,3-butadiene, isoprene, 2,3-dimethyl-1,3-butadiene, 1,3-pentadiene, 2,4-hexadiene, 1,3-cyclohexadiene, 2-chloro-1,3-butadiene; and/or the monoolefin is an aromatic monovinyl compound, optionally, one or more of styrene, α-methylstyrene, p-tert-butylstyrene, butoxystyrene, vinyltoluene, chlorostyrene and vinylnaphthalene. Thus, the hydrophilicity and adhesiveness of the hydrophilic polymer can be further improved.

In a preferred embodiment of the hydrophilic polymer of the present disclosure, the hydrophilic group is selected from at least one of a hydroxyl, an amino, and a carboxyl, optionally a hydroxyl. Thus, the hydrophilicity and adhesiveness of the hydrophilic polymer can be further improved.

In a preferred embodiment of the hydrophilic polymer of the present disclosure, at least two of $R_1$, $R_2$ and $R_3$ are hydrophilic groups and the others are each independently selected from hydrogen atoms, or an alkyl with 1-4 carbon atoms. Thus, the hydrophilicity and adhesiveness of the hydrophilic polymer can be further improved.

In a preferred embodiment of the hydrophilic polymer of the present disclosure, $X_1$ and $X_2$ are hydrogen atoms, and $X_3$ is selected from alkyls with 1-4 carbon atoms.

In a preferred embodiment of the hydrophilic polymer according to the disclosure, the number average molecular weight Mn thereof is $12\times10^4$-$17\times10^4$.

In a preferred embodiment of the hydrophilic polymer of the present disclosure, a ratio of parts by mass of the conjugated diene, the monoolefin, and the hydrophilic monomer is 10-90:90-10:1-6. Thus, it is possible to prepare a hydrophilic polymer having stronger adhesive force and no gelation.

The present disclosure also relates to a method for preparing a hydrophilic polymer, including a step of polymerizing a conjugated diene, a monoolefin and a hydrophilic monomer represented by Formula I to obtain the above-mentioned hydrophilic polymer;

Formula I

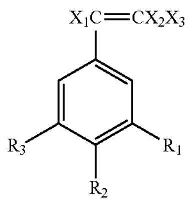

where $X_1$, $X_2$ and $X_3$ are each independently selected from hydrogen atoms, or a linear or branched alkyl with 1-4 carbon atoms; at least one of the $R_1$, $R_2$ and $R_3$ is hydrophilic group; and the others are each independently selected from hydrogen atoms, or an alkyl or alkoxy with 1-4 carbon atoms.

In a preferred embodiment a method for preparing the hydrophilic polymer of the present disclosure, the hydrophilic polymer is a random copolymer; the conjugated diene is one or more of 1,3-butadiene, isoprene, 2,3-dimethyl-1,3-butadiene, 1,3-pentadiene, 2,4-hexadiene, 1,3-cyclohexadiene, 2-chloro-1,3-butadiene; and/or the monoolefin is selected from an aromatic monovinyl compound, optionally, one or more of styrene, α-methylstyrene, p-tert-butylstyrene, butoxystyrene, vinyltoluene, chlorostyrene and vinylnaphthalene. Thus, the hydrophilicity and adhesiveness of the hydrophilic polymer can be further improved.

In a preferred embodiment of the hydrophilic polymer of the disclosure, the hydrophilic group is selected from at least one of a hydroxyl, an amino, and a carboxyl, optionally a hydroxyl. Thus, the hydrophilicity and adhesiveness of the hydrophilic polymer can be further improved.

In a preferred embodiment of the method for preparing the hydrophilic polymer of the present disclosure, at least two of $R_1$, $R_2$ and $R_3$ are hydrophilic groups and the others are each independently selected from hydrogen atoms, or an alkyl with 1-4 carbon atoms. Thus, the hydrophilicity and adhesiveness of the hydrophilic polymer can be further improved.

In a preferred embodiment of the hydrophilic polymer of the present disclosure, $X_1$ and $X_2$ are hydrogen atoms, and $X_3$ is selected from alkyls with 1-4 carbon atoms.

In a preferred embodiment of the method for preparing the hydrophilic polymer of the present disclosure, a number average molecular weight Mn thereof is $12\times10^4$-$17\times10^4$.

In a preferred embodiment of the method for preparing the hydrophilic polymer of the present disclosure, in the hydrophilic polymer, a ratio of parts by mass of the conjugated diene, the monoolefin, and the hydrophilic monomer is 10-90:90-10:1-6. Thus, it is possible to prepare a hydrophilic polymer having stronger adhesive force and no gelation.

Further, the present disclosure relates to an electrode active material slurry including an electrode active material, a dispersion medium, and the above hydrophilic polymer as a binder. Optionally, the above-mentioned electrode active material slurry is an anode active material slurry. As a result, it is possible to produce an active material layer which reduces the problems of floating and roll sticking of the binder.

The present disclosure also relates to a lithium ion secondary battery including a positive pole plate, a negative pole plate, a separator and an electrolyte; wherein the negative pole plate includes a negative electrode membrane layer prepared from the above-mentioned electrode active material slurry described above. Thus, a lithium ion secondary battery having a longer life can be obtained.

The present disclosure also relates to a battery pack including the lithium ion secondary battery described above. Thus, a battery pack having a longer life can be obtained.

The present disclosure also relates to an electric device including at least one of the lithium ion secondary battery and the battery pack described above. As a result, an electric device having a longer life can be obtained.

DESCRIPTION OF REFERENCE NUMERALS

Figure 1:
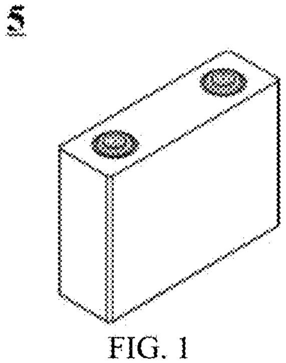
FIG. 1 is a schematic view of a secondary battery according to an embodiment of the present disclosure.

1, battery pack; 2, upper box body; 3, lower box body; 4, battery module; 5, secondary battery; 51, housing; 52, electrode assembly; 53, cover plate.

DESCRIPTION OF EMBODIMENTS

Hereinafter, the present disclosure will be described in detail with appropriate reference to the accompanying drawings. However, there may be cases where unnecessary detailed description is omitted. For example, detailed descriptions of well-known matters and repeated descriptions of practically identical structures are omitted. This is to avoid unnecessarily redundancy of following description to facilitate the understanding of those skilled in the art. In addition, the drawings and the following description are provided to enable those skilled in the art to fully understand the present disclosure and are not intended to limit the subject matter recited in the claims.

The "ranges" disclosed herein are defined in terms of lower and upper limits, a given range being defined by selecting a lower limit and an upper limit, the selected lower and upper limits define the boundaries of the particular range. Ranges defined in this manner may or may not be inclusive and can be arbitrarily combined, i.e. any lower limit can be combined with any upper limit to form a range. For example, if ranges of 60-120 and 80-110 are listed for a particular parameter, it should be understood that ranges of 60-110 and 80-120 are also contemplated. In addition, if the minimum range values listed are 1 and 2 and the maximum range values listed are 3, 4, and 5, the following ranges: 1-3, 1-4, 1-5, 2-3, 2-4 and 2-5 are all contemplated. In this application, unless otherwise indicated, the numerical range "a-b" denotes an abbreviated representation of any real number combination between a and b, where a and b are both real numbers. For example, a numerical range of "0-5" indicates that all real numbers between "0 and 5" have been fully set forth herein, and "0-5" is merely a shorthand representation of combinations of these numbers. In addition, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and alternative embodiments of the present disclosure may be combined with each other to form a new technical solution.

Unless otherwise specified, all the technical features and optional technical features of the present disclosure may be combined with each other to form a new technical solution.

Unless otherwise specified, all steps of the present disclosure may be performed sequentially or may be performed randomly, preferably sequentially. For example, the process includes steps (a) and (b), meaning that the process may include steps (a) and (b) performed sequentially, or may include steps (b) and (a) performed sequentially. For example, the referenced process may further include step (c), meaning that step (c) may be added to the process in any order. For example, the process may include steps (a), (b) and (c), may also include steps (a), (c) and (b), may also include steps (c), (a) and (b), etc.

Unless otherwise specified, reference to "including" and "comprising" in this application are intended to be open-ended as well as closed-ended. For example, reference to "including" and "comprising" may mean that other components not listed may also be included or included, or that only listed components may be included or included.

Unless otherwise specified, in this application, the term "or" is inclusive. For example, the phrase "A or B" means "A, B, or both A and B". More specifically, the condition "A or B" is satisfied by any one of the following conditions: A is true (or present) and B is false (or not present); A is false (or absent) and B is true (or present); or both A and B are true (or present).

In the present disclosure, unless otherwise specified, "%" generally means "% by mass" and "part" means "part by mass".

As a water-based binder, in the current mainstream solution, the styrene-butadiene copolymer (hereinafter also simply referred to as styrene-butadiene rubber or SBR) emulsion is used as a binder, which is made into slurry together with carboxymethyl cellulose (CMC) as a thickener, for bonding anode materials of lithium battery such as graphite.

In such a slurry system, CMC is adsorbed on the surface of hydrophobic graphite particles via a hydrophobic, non-carboxyl-modified main chain, and the graphite adsorbed with CMC is stably suspended in water through hydrophilic carboxyls. The good elasticity of SBR and the good dispersion effect of CMC are used to realize the bonding of anode materials of lithium battery.

However, due to the hydrophobicity of SBR, it is likely that the compatibility of the graphite slurry becomes poor after dispersing SBR and CMC. Such water-based CMC-SBR mixed binders tend to SBR floating when the slurry is left standing during the preparation of negative pole plates. Furthermore, due to the scattering of visible light by the SBR particles, the blue light with a shorter wavelength has a strong scattering intensity, thus, it is prone to occur the phenomenon of slurry floating blue.

In addition, during the coating and drying process of a pole plate, for example, a negative pole plate, the upper and lower parts of the pole plate are heated unevenly, and a convection phenomenon and a capillary phenomenon are further generated inside the pole plate, which makes SBR tends to rise to the surface of the pole plate along with the movement of moisture, thereby resulting in an uneven distribution of the dried binder in the longitudinal direction of the pole plate, which may not only cause a decrease in the adhesive force between the active materials and between the active materials and the current collector, causing a roll sticking on the roller of the negative pole plate, but also cause a membrane stripping in severe cases, finally resulting in a decrease of the battery performance.

The hydrophilic polymer of the present disclosure is obtained by radical emulsion copolymerization of a conjugated diene, a monoolefin and a hydrophilic monomer represented by Formula I below:

Formula I

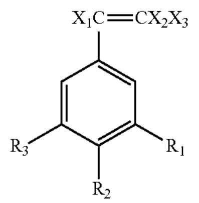

where $X_1$, $X_2$ and $X_3$ are each independently selected from hydrogen atoms, or a linear or branched alkyl with 1-4 carbon atoms; at least one of the $R_1$, $R_2$ and $R_3$ is hydrophilic group; and the others are each independently selected from hydrogen atoms, or an alkyl or alkoxy with 1-4 carbon atoms.

In the hydrophilic copolymer, a ratio of parts by mass of the conjugated diene, the monoolefin, and the hydrophilic monomer is 10-90: 90-10:1-6, more preferably, 10-30: 90-70:3-6.

Other monomers copolymerizable with the conjugated diene, the monoolefin and the hydrophilic monomer may also be copolymerized within a range not affecting the effect of the present disclosure.

Conjugated Diene

Examples of the conjugated diene include conjugated dienes with 4 or more carbon atoms, such as 1,3-butadiene, isoprene, 2,3-dimethyl-1,3-butadiene, 1,3-pentadiene, 2,4-hexadiene, 1,3-cyclohexadiene, 2-chloro-1,3-butadiene, and the like. These conjugated dienes can be used alone or in combination of two or more. From the viewpoint of improving the peel strength of the electrode, 1,3-butadiene and isoprene are preferred. The 1,3-butadiene is more preferred from the viewpoint of improving the thermal stability of the polymer and further improving the peel strength and moisture resistance of the electrode.

In addition, within the scope of not impairing the purpose of the disclosure, the above-mentioned conjugated diene monomer may also have a substituent commonly used in the art. As such a substituent, a linear or branched $C_{1-6}$ alkyl or a haloalkyl thereof may be mentioned, specifically including, methyl, ethyl, n-propyl, isopropyl, n-butyl, sec-butyl, tert-butyl, 1-methylbutyl, 2-methylbutyl, 3-methylbutyl, 1,1-dimethylpropyl, 1,2-dimethylpropyl, 2,2-dimethylpropyl, n-pentyl, 1-methylpentyl, 2-methylpentyl, 3-methylpentyl, 4-methylpentyl, 1,1-dimethylbutyl, 1,2-dimethylbutyl, 1,3-dimethylbutyl, 1,4-dimethylbutyl, 2,2-dimethylbutyl, 2,3-dimethylbutyl, 3,3-dimethylbutyl, and n-hexyl. Further, as the above-mentioned haloalkyl, some groups are presented with one or more hydrogen atoms of the above-mentioned linear or branched $C_{1-6}$ alkyl may be substituted with fluorine, chlorine, bromine or iodine.

Monoolefin

Examples of the monoolefin include compounds having one unsaturated olefinic bond, such as aromatic monovinyl compounds, or olefins such as ethylene and propylene; acrylic compounds such as (meth)acrylic acid, methyl (meth)acrylate, and butyl (meth)acrylate; halogenated olefins such as vinyl fluoride and vinyl chloride; unsaturated fatty acids such as oleic acid; vinyl acetate, acrylonitrile, and the like. Preferred are aromatic monovinyl compounds.

Examples of the aromatic monovinyl compounds include vinyl derivatives of monocyclic, polycyclic or fused-ring aromatic compounds, and examples thereof include vinyl derivatives of benzene, biphenyl, naphthalene, anthracene, phenanthrene, chrysene, perylene and benzopyrene. Also, the vinyl derivatives of the above-mentioned aromatic compound may have various substituents such as a $C_{1-6}$ alkyl, a $C_{1-6}$ alkoxy, a halogen, etc. within the scope of not impairing the purpose of the present disclosure. Examples of such monoolefins include styrene, α-methylstyrene, p-tert-butylstyrene, butoxystyrene, vinyltoluene, chlorostyrene, and vinylnaphthalene. Among these, styrene is preferable from the viewpoints of improving the thermal stability of the particulate polymer, and improving the peel strength and moisture resistance of the electrode. These monoolefins can be used alone or in combination of two or more, preferably alone.

Hydrophilic Monomer

As the hydrophilic monomer of the present disclosure, it is a hydrophilic monomer represented by Formula I below, Formula I

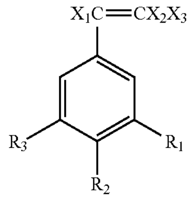

where $X_1$, $X_2$ and $X_3$ are each independently selected from hydrogen atoms, or a linear or branched alkyl with 1-4 carbon atoms; at least one of the $R_1$, $R_2$ and $R_3$ is hydrophilic group; and the others are each independently selected from hydrogen atoms, or an alkyl or alkoxy with 1-4 carbon atoms.

Among the above-mentioned hydrophilic monomers, examples of the above-mentioned hydrophilic groups may include hydroxyls, aminos, carboxyls, sulfonic acid groups, phosphoric acid groups and other hydrophilic groups commonly used in the art which readily form hydrogen bonds. There may be one or two or more of these hydrophilic groups. Hydroxy, amino, and carboxyl are preferred, hydroxy and amino are more preferred, and hydroxy are particularly preferred, from the viewpoint of improving the viscosity stability of the slurry composition and improving the peel strength of the electrode, and resistance to harsh environments such as acid, alkali, high temperature, and high humidity.

The hydrophilic monomer may have only one group selected from the hydrophilic groups, or may have two or more groups. It is preferable to have two hydrophilic groups, and it is more preferably that two hydrophilic groups are located at the positions adjacent to each other on the benzene ring, from the viewpoints of improving the viscosity stability of the slurry composition and improving the peel strength of the electrode, and resistance to harsh environments such as acid, alkali, high temperature, high humidity, etc.

Further, in the case where the total value of the repeating units from the monoolefin and the conjugated diene is 100 parts by mass, the added amount of the repeating units of the hydrophilic monomer is preferably 1 part by mass or more, more preferably 3 parts by mass or more, and preferably 6 parts by mass or less, more preferably 4 parts by mass or less. When the added amount of the repeating unit of the hydrophilic monomer is within the above range, it can improve the stability of the slurry composition, improve the coating density, and inhibit the floating of the binder, thereby inhibiting the problem of roll sticking when the pole plate is rolled, and further improving the operability of the electrode of the electrode composite layer.

In the present disclosure, the hydrophilicity of the binder is structurally improved by copolymerizing a conjugated diene, a monoolefin, and a hydrophilic monomer, so that the binder has a stronger affinity with an active substance, and the problems of floating during drying and roll sticking during rolling are fundamentally avoided.

Although the mechanism of improvement of the binder system by the hydrophilic polymer with such a structure is not clear, the present inventors conclude that it is due to the effect of covalent and non-covalent bonds by the hydrophilic group and the aromatic ring in the hydrophilic polymer of the present disclosure. Specifically, since the hydrophilic polymer monomer of the present disclosure has an aromatic ring structure and at least one hydrophilic substituent, it has the following non-covalent interaction (i), (ii), (iii) and covalent interaction (iv).

(i) Hydrogen-bond action: in hydrophilic groups, such as hydroxyls, aminos, carboxyls, sulfonic acid groups and phosphoric acid groups, non-hydrogen elements therein, such as O, N, P and S, have a strong polarity per se, which makes the hydrophilic groups easy to form hydrogen bonds with other polar groups. Since the hydrophilic group also has lone pair electrons, it can form hydrogen bonds with hydrogen atoms of other active groups.

(ii) Coordination action: the non-hydrogen element in the hydrophilic group makes the hydrophilic group have weak acid/weak basicity and strong reducibility, a strong metal coordination ability, and easy to form a chelate with $Fe^{3+}$, $Cu^{2+}$, $V^{3+}$ and other metal ions, so as to achieve a phase transition from a fluid to a solid, and then achieve the curing of the binder;

(iii) π-π stacking action: since the hydrophilic polymer of the present disclosure has a benzene ring and aromaticity, the valence electrons therein participate in bond formation with an SP2 hybrid orbital, and it is easy to form an electron interaction of π-π non-covalent bonds with other aromatic ring groups, such as an aromatic ring group in a monoolefin, and an SP2 hybrid electron in an active substance such as graphite.

(iv) Covalent bond action: in the hydrophilic groups of $R_1$, $R_2$ and $R_3$, since the hydrophilic groups all have high activity, they are easy to be oxidized, which is conductive to the polymerization reaction, and are easy to react with substances containing amino or mercapto groups, such as Schiff base reaction and Michael addition reaction, thus forming stable covalent bonds and strengthening the adhesiveness of the binder.

The present inventors concluded that in the present disclosure, since a copolymer of a hydrophilic monomer and a conjugated diene or mono-olefin is used, it is possible to structurally enhance the affinity between the binder and the active substance by using the above-mentioned actions of (i), (ii), (iii) and (iv), and fundamentally avoid the problem of floating of the binder during drying and the roll sticking during rolling.

Particularly preferably, when the hydrophilic groups of $R_1$, $R_2$ and $R_3$ are two adjacent hydroxyls (—OH), namely, when the hydrophilic monomer has a catechol structure, a hydrogen bond is easily formed due to the strong polarity of the phenolic hydroxyl group. It has strong reducibility, weak acidity and very strong metal coordination ability. Also, the valence electron of the oxygen atom is easy to participate in bonding via the SP2 hybrid orbital, and it is easy to be realize the electron interaction with the π-π non-covalent bonds of other aromatic ring groups. Phenolic hydroxyl itself is easily oxidized to form a highly chemically active 2-benzoquinone, which facilitates polymerization, and it is more likely to react with substances containing amino or mercapto such as Schiff reduction and Michael addition, thereby more likely to form stable covalent bonds and cure the binder. It is particularly preferred.

By copolymerizing a hydrophilic monomer with a conjugated diene or monoolefin during synthesis, the hydrophilicity of the copolymer itself can be increased, the adhesiveness between the active material and the current collector can be enhanced, and the floating problem of the pole plate during drying can be improved.

Other Monomers

The hydrophilic polymers of the present disclosure may also contain other monomers without affecting their properties. The other monomers are not particularly limited as long as it can be copolymerized with the conjugated diene, monoolefin and hydrophilic monomer. The other monomers may be polymerized together with the conjugated diene, the monoolefin and the hydrophilic monomer to obtain a hydrophilic polymer. It can also be further copolymerized or grafted with the polymer after the conjugated diene, the monoolefin, and the hydrophilic monomer are polymerized into a hydrophilic polymer.

Preparing Method of the Hydrophilic Polymers

Another aspect of the present disclosure relates to a method for preparing a hydrophilic polymer by dispersing the above-mentioned conjugated diene, monoolefin and hydrophilic monomer in a dispersion medium, adding an emulsifier and a molecular weight regulator as needed to prepare a mixed solution, and then carrying out copolymerization in the presence of an initiator to obtain a hydrophilic polymer or a dispersion liquid thereof.

The method of polymerizing the conjugated diene, the monoolefin, and the hydrophilic monomer is not particularly limited. From the viewpoint of the active group during polymerization, free radical polymerization, active free radical polymerization, cationic polymerization, or anionic polymerization can be mentioned. From the viewpoint of the kind of the polymerization system, suspension polymerization, emulsion polymerization or solution polymerization can be mentioned. From the viewpoint of ease of polymerization and post-treatment, free radical polymerization is preferred, and free radical emulsion polymerization is more preferred.

Dispersion Medium

The dispersion medium used in the present disclosure can be a dispersion medium generally used in the copolymerization, for example, water, alcohols, esters, ethers, ketones, alkanes, halogenated hydrocarbons, amides, etc. or a mixture thereof. From the viewpoint of environmental protection, water is preferred.

Free Radical Initiator

The initiator used in the present disclosure can be various water-soluble or oil-soluble free radical initiators commonly used in free radical polymerization, specifically including azo compounds such as azo-diisobutyronitrile, azo-diisoheptanenitrile, azo-diisobutyric acid dimethyl ester initiator, azo-diisobutylamidine hydrochloride and the like; inorganic peroxides and persulfates such as hydrogen peroxide, ammonium persulfate, sodium persulfate, potassium persulfate; and peroxides such as benzoyl peroxide, cumene peroxide, t-butyl benzoyl peroxide and butanone peroxide.

The added amount of the above-mentioned radical initiator is not particularly limited, and may be appropriately added according to the amount of the hydrophilic polymer. In the case where the total amount of the monomers constituting the structural unit of the hydrophilic polymer is 100% by mass, it is preferably 0.1-2%, and more preferably 0.15-1%. By appropriately adjusting the amount of initiator used, the molecular weight of the hydrophilic polymer can be controlled.

In the hydrophilic polymer of the present disclosure, the number average molecular weight of the hydrophilic polymer of the present disclosure is preferably $8\times10^4$-$30\times10^4$, more preferably $12\times10^4$-$17\times10^4$, in order to achieve viscosity stability of the slurry composition and improvement of peel strength of the electrode, and considering easy dispersibility and easy coatability of the slurry composition. Molecular weights are converted to those of polystyrene as determined by the gel permeation chromatography (GPC).

Emulsifier

In the production of the hydrophilic polymer of the present disclosure, an emulsifier or the like may also be added as needed.

The emulsifier used in the present disclosure can be an emulsifier commonly used in free radical emulsion copolymerization such as an anionic emulsifier, a cationic emulsifier, a nonionic emulsifier and an amphoteric emulsifier.

Examples of the anionic emulsifier include carboxylate (soap) emulsifiers such as sodium oleate, potassium oleate, sodium stearate, potassium stearate, sodium abietate, sodium laurate, potassium laurate, sodium naphthenate, rosin oil soap and the like; sulfonate-type emulsifiers such as alkylbenzene sulfonate, α-olefin sulfonate, alkyl sulfonate, α-sulfomonocarboxylic ester, sulfoalkyl fatty acid ester, succinate sulfonate, alkyl naphthalene sulfonate, petroleum sulfonate, lignin sulfonate, alkyl glycerol ether sulfonate and the like; sulphate type emulsifiers such as lauryl sulfate, alkyl sulfate, allyl polyoxyethylene ether sulfate and the like; phosphate type emulsifiers such as monoester and diester of alkyl phosphate, monoester and diester phosphates of fatty alcohol polyoxyethylene ether and monoester and diester phosphates of alkylphenol polyoxyethylene ether and the like.

Examples of the cationic emulsifier include alkylamine salts such as dodecylammonium chloride, cetyltrimethyl ammonium bromide, cetylpyridinium bromide, and quaternary ammonium salts.

Examples of the nonionic emulsifier include nonionic emulsifiers or heterocyclic emulsifiers having an ether group, an ester group, or an amide group in the molecule. The specific examples thereof include diol-type or polyol-type nonionic emulsifiers such as ethylene oxide, propylene oxide, block copolymers of ethylene oxide and propylene oxide, polyvinyl alcohol and the like.

As the amphoteric emulsifier, various amino acid and betaine type amphoteric emulsifiers may be mentioned.

The added amount of the above emulsifier is not particularly limited, and may be appropriately added according to the amount of the hydrophilic polymer. In the case where the total value of the monomers constituting the structural unit of the hydrophilic polymer is 100% by mass, it is preferably 0.2-2%, and more preferably 0.2-0.5%.

Molecular Weight Regulator

In the production of the hydrophilic polymer of the present disclosure, a molecular weight regulator or the like may also be added as needed.

In the hydrophilic polymer of the present disclosure, a molecular weight regulator may be added as needed in order to adjust the molecular weight of the copolymer. The molecular weight regulator used in the present disclosure invention may include aliphatic mercaptans, xanthic acid disulfides, polyhydric phenols and the like commonly used in radical emulsion copolymerization, and specifically including, dodecyl mercaptan, dodecyl mercaptan acetate, dilauryl mercaptan oxalate, diisopropyl xanthogen disulfide, phenol, eugenol and the like.

The added amount of the above molecular weight regulator is not particularly limited, and may be appropriately added in accordance with the target molecular weight of the above hydrophilic polymer. In the case where the total value of the monomers constituting the structural unit of the hydrophilic polymer is 100% by mass, it is preferably 0.1-1%, more preferably 0.1-0.5%. By appropriately adjusting the amount of the molecular weight regulator, the molecular weight of the hydrophilic polymer can be controlled.

The emulsification method for copolymerizing the above-mentioned conjugated diene, monoolefin and hydrophilic monomer is not particularly limited, an emulsification method commonly used in the art can be used. For example, as the emulsification apparatus, various known emulsification dispersion machines can be used, and specifically, IKA-LTRA-TURRA may be exemplified. In addition, the conditions for emulsification operation using the emulsification dispersion machine, for example, the treatment temperature, the treatment time, etc. are not particularly limited, and may be selected depending on the types of the emulsifier and the radical initiator, as long as they are appropriately selected in such a manner that the desired dispersion state is obtained.

It should be noted that in the above-mentioned polymerization and emulsification, the types and added amount of the additives such as the emulsifier, the initiator, the dispersion medium, the molecular weight regulator, etc. are listed, but those skilled in the art will understand that the additives such as the emulsifier, the dispersion medium, the initiator, the molecular weight regulator, etc. used above can be used in the types and addition amounts generally used, and can be appropriately adjusted according to the polymerization method, etc.

In the present disclosure, the hydrophilic polymer particles obtained after copolymerization have a particle size of 80-400 nm, preferably 100-200 nm. The smaller the particle size of the hydrophilic polymer particles, the more contact points between the binder with the active substance, and thus the adhesiveness may be increased. However, when the particle size is too small, it is easy to migrate during the drying process, resulting in the problem of floating. Also, when the particle size is too small, the dynamic performance of the lithium-ion secondary battery may be affected. By making the hydrophilic polymer particles have the above particle diameters, it is possible to have good adhesiveness while suppressing floating.

Further, in the present specification, the particle size of the hydrophilic polymer particles obtained after copolymerization refers to the particle size measured by the laser diffraction.

In addition, in order to improve the viscosity stability of the slurry composition and the peel strength of the electrode, and avoid slurry floating blue due to insufficient polymerization and the consequent floating of the binder, it is preferable in the copolymerization of the present disclosure to perform stirring at a lower rotational speed at a lower temperature under pressure. For example, the copolymerization is performed at a temperature of 20-100° C., preferably 70-95° C., under a pressure of 0.1-2.0 MPa, preferably 0.6-1.0 MPa, at a rotation speed of 100-250 rpm, preferably 150-200 rpm. Thus, hydrophilic polymer particles having a particle size within the above range can be obtained, which are particularly suitable for preparing a slurry for preparing a lithium-ion battery pole plate.

The dispersion obtained as described above has a solid content of 30-70%, preferably 40-60%. When the solid content is too low, the preparing equipment will be heavy and the preparing efficiency will become low. When the solid content is too high, there is a concern that it will become uneven during the stirring.

In addition, during the copolymerization of the present disclosure, it is preferable to control the pH of the dispersion liquid at 6-9 in order to improve the viscosity stability of the slurry composition and the peel strength of the electrode, and avoid slurry floating blue due to insufficient polymerization and the consequent floating of the binder. The pH may be controlled by using acids or bases commonly used in the art, preferably weak acids or weak bases, such as acetic acid, hydrochloric acid, sulfuric acid and other acids; and ammonia, sodium hydroxide, potassium hydroxide and diethylamine alcohol and other bases.

Active Material Slurry

The hydrophilic polymer of the present disclosure may be dispersed in a dispersion medium together with an electrode active material and other materials added as required to prepare an active material slurry composition The electrode active material is not particularly limited, and various active materials contained in the pole plate described later can be used.

Negative Pole Plate

The negative pole plate includes a negative pole current collector and a negative pole membrane layer disposed on at least one surface of the negative pole current collector, the negative pole membrane layer including a negative pole active material.

As an example, the negative pole current collector has two surfaces opposed in its own thickness direction. The negative pole membrane layer is arranged on either or both of the two surfaces opposed to the negative pole current collector.

In some embodiments, the negative current collector may be a metal foil or a composite current collector. For example, a copper foil may be used as the metal foil. The composite current collector may include a polymeric material base layer and a metal layer formed on at least one surface of the polymeric material substrate. The composite current collector may be formed by forming a metallic material (copper, copper alloy, nickel, nickel alloy, titanium, titanium alloy, silver, silver alloy, etc.) on a substrate of a high molecular material (such as a substrate of polypropylene (PP), polyethylene terephthalate (PET), polybutylene terephthalate (PBT), polystyrene (PS), polyethylene (PE), etc.).

In some embodiments, the negative pole active material can be a negative pole active material known in the art for batteries. As an example, the negative pole active material may include at least one of the following materials: artificial graphite, natural graphite, soft carbon, hard carbon, silicon-based materials, tin-based materials and lithium titanate, etc. The silicon-based material may be selected from at least one of elemental silicon, silicon-oxygen compounds, silicon-carbon complexes, silicon-nitrogen complexes, and silicon alloys. The tin-based material may be selected from at least one of elemental tin, tin oxide compounds, and tin alloys. However, the present disclosure is not limited to these materials, and other conventional materials that can be used as a negative pole active material for a battery can also be used. These negative pole active materials may be used alone as one or in combination of two or more.

In some embodiments, the negative pole membrane layer also includes a binder. The binder contains the hydrophilic polymer of the present disclosure.

Since the hydrophilic monomer is copolymerized with the conjugated diene and the monoolefin in the polymerization process, a hydrophilic polymer is thus obtained. When the hydrophilic polymer is used as a binder, not only the hydrophilicity of the binder increases significantly, but also the phenomenon that the binder floats to the surface along with the evaporation of water during drying can be reduced. Furthermore, since the adhesive thus obtained has a strong bonding force in structure itself, the bonding strength with the active material and the pole plates can be enhanced.

In some embodiments, the negative pole membrane layer also optionally includes a conductive agent. The conductive agent can be selected from at least one of superconducting carbon, acetylene black, carbon black, ketjen black, carbon dots, carbon nanotubes, graphene, and carbon nanofibers.

In some embodiments, the negative pole membrane layer may also optionally include other adjuvants, such as thickeners (e.g., sodium carboxymethylcellulose (CMC-Na)), etc.

In some embodiments, the negative pole plate can be prepared by dispersing the above-mentioned components for preparing a negative pole plate, such as a negative pole active material, a conductive agent, a binder, and any other components, in a dispersion medium (such as deionized water) to form an anode slurry; coating the anode slurry on the negative pole current collector; and after drying, cold pressing and other processes, the negative pole plate can be obtained.

Positive Pole Plate

The positive pole plate includes a positive pole current collector and a positive pole membrane layer disposed on at least one surface of the positive pole current collector, the positive pole membrane layer including a positive pole active material.

As an example, the positive pole current collector has two surfaces opposed in its own thickness direction. The positive pole membrane layer is arranged on either or both of the two surfaces opposed to the positive pole current collector.

In some embodiments, the positive current collector can be a metal foil or a composite current collector. For example, an aluminum foil may be used as the metal foil. The composite current collector can include a polymer material base layer and a metal layer formed on at least one surface of the polymer material base layer. The composite current collector can be formed by forming a metallic material (aluminum, aluminum alloy, nickel, nickel alloy, titanium, titanium alloy, silver, silver alloy, etc.) on a substrate of a high molecular material (such as a substrate of polypropylene (PP), polyethylene terephthalate (PET), polybutylene terephthalate (PBT), polystyrene (PS), polyethylene (PE), etc.).

In some embodiments, the positive pole active material can be a positive pole active material known in the art for batteries. As an example, the positive pole active material can include at least one of the following materials: lithium-containing phosphates of the olivine structure, lithium transition metal oxides and their respective modified compounds. However, the present disclosure is not limited to these materials, and other conventional materials that can be used as a positive pole active material for a battery can also be used. These positive pole active materials can be used alone or in combination of two or more. Examples of the lithium transition metal oxide can include, but are not limited to, at least one of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (also referred to $NCM_{333}$ for short), $LiNi_{0.5}Co_{0.2}Mn_{0.3}O_2$ (also referred to $NCM_{523}$ for short), $LiNi_{0.5}Co_{0.25}Mn_{0.25}O_2$ (also referred to as $NCM_{211}$ for short), $LiNi_{0.6}Co_{0.2}Mn_{0.2}O_2$ (also referred to as $NCM_{622}$ for short), $LiNi_{0.8}Co_{0.1}Mn_{0.1}O_2$ (also referred to $NCM_{811}$ for short), lithium nickel cobalt aluminum oxide (such as $LiNi_{0.85}Co_{0.15}Al_{0.05}O_2$) thereof, and the modified compounds thereof, etc. Examples of the lithium-containing phosphate of the olivine structure can include, but are not limited to, at least one of lithium iron phosphate (such as $LiFePO_4$ (also referred to LFP for short)), a composite of lithium iron phosphate and carbon, lithium manganese phosphate (such as $LiMnPO_4$), a composite of lithium manganese phosphate and carbon, lithium iron manganese phosphate, a composite of lithium iron manganese phosphate and carbon.

In some embodiments, the positive pole membrane layer also includes a binder. The binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin, and may also contain a hydrophilic polymer of the disclosure.

In some embodiments, the positive pole membrane layer also optionally includes a conductive agent. As an example, the conductive agent can include at least one of superconducting carbon, acetylene black, carbon black, ketjen black, carbon dots, carbon nanotubes, graphene, and carbon nanofibers.

In some embodiments, the positive pole plate can be prepared by dispersing the above-mentioned components for preparing a positive pole plate, such as a positive pole active material, a conductive agent, a binder and any other components, in a dispersion medium to form a cathode slurry; coating the cathode slurry on the positive pole current collector; and after drying, cold pressing and other processes, the positive pole plate can be obtained.

Electrolyte

The electrolyte serves to conduct ions between the positive pole plate and the negative pole plate. The type of electrolyte is not specifically limited in the present disclosure, and can be selected according to requirements. For example, the electrolyte can be liquid, gel, or all-solid.

In some embodiments, the electrolyte employs an electrolyte solution. The electrolyte solution includes an electrolyte salt and a solvent.

In some embodiments, the electrolyte salt can be selected from at least one of lithium hexafluorophosphate, lithium tetrafluoroborate, lithium perchlorate, lithium hexafluoroarsenate, lithium bisfluorosulfonimide, lithium bis-trifluoromethane sulfonimide, lithium triflate, lithium difluorophosphate, lithium difluorooxalato borate, lithium dioxalato borate, lithium difluorobisoxalato phosphate, and lithium tetrafluorooxalato phosphate.

In some embodiments, the solvent can be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, ethylene fluorocarbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte further optionally includes an additive. For example, the additive may include a negative pole membrane-forming additive, a positive pole membrane-forming additive, and may further include an additive capable of improving certain properties of the battery, for example, an additive for improving overcharge properties of the battery, an additive for improving high-temperature or low-temperature properties of the battery, etc.

Separator

In some embodiments, the secondary battery may include a separator. The type of the separator is not particular limited in the present disclosure. Any known porous structure separator having good chemical stability and mechanical stability may be selected In some embodiments, the material of the separator may be selected from at least one of glass fiber, non-woven fabric, polyethylene, polypropylene, and polyvinylidene fluoride. The separator may be a single-layer membrane or a multi-layer composite membrane, without particular limitation. When the separator is a multilayer composite membrane, the materials of each layer may be the same or different, without particular limitation.

In some embodiments, the electrode assembly may be made with the positive pole plate, the negative pole plate and the separator by a winding process or a lamination process.

In some embodiments, the secondary battery may include an outer package. The outer package may be used to encapsulate the electrode assembly and the electrolyte.

In some embodiments, the outer package of the secondary battery may be a hard case such as a hard plastic case, an aluminum case, a steel case, and the like. The outer package of the secondary battery may also be a soft package, such as a pouch-type package. The material of the soft package may be plastic, as plastic, polypropylene, polybutylene terephthalate, polybutylene succinate, etc. may be listed.

The shape of the secondary battery is not particularly limited in the present disclosure, and may be cylindrical, square or any other shape. For example, FIG. 1 is a secondary battery 5 having a square structure as one example.

Figure 2:
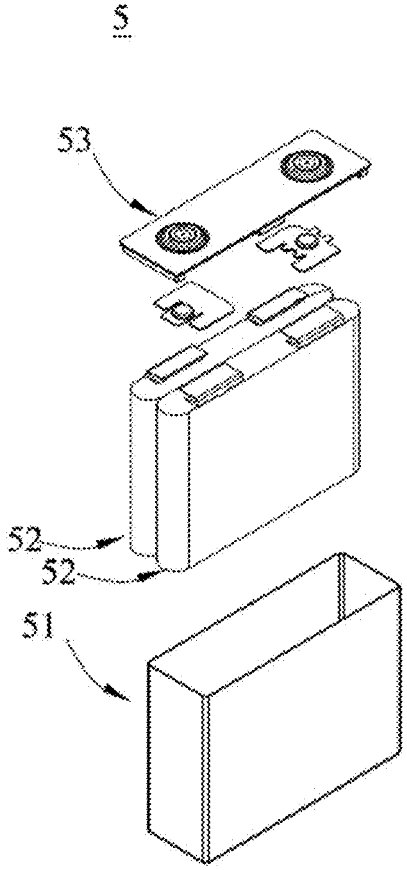
FIG. 2 is an exploded view of the secondary battery of an embodiment of the present disclosure shown in FIG. 1.

In some embodiments, referring to FIG. 2, the outer package may include a housing 51 and a cover plate 53. Wherein, the housing 51 may include a bottom plate and a side plate connected to the bottom plate, the bottom plate and the side plate are enclosed to form a receiving cavity. The housing 51 has an opening communicating with the receiving cavity. The cover plate 53 may be covered on the opening to enclose the receiving cavity. The positive pole plate, the negative pole plate, and the separator may be formed to the electrode assembly 52 by a winding process or a lamination process. An electrode assembly 52 is encapsulated within the receiving cavity. The electrolyte is infiltrated into the electrode assembly 52. The number of the electrode assemblies 52 contained in the secondary battery 5 may be one or more. A person skilled in the art would have been able to make a selection according to specific actual requirements.

In some embodiments, one or more secondary batteries 5 may be assembled into a battery pack 1 after being assembled into a battery module 4. The number of battery modules 4 contained in the battery pack 1 may be one or more. The specific number may be selected by a person skilled in the art according to the application and capacity of the battery pack 1.

In addition, the present disclosure also provides an electrical device including at least one of the secondary battery, the battery module, or the battery packs provided herein. The secondary battery, the battery module, or the battery pack may be used as a power source for the electrical device as well as an energy storage unit for the electrical device. The electrical device may include, but is not limited to, mobile equipment (e.g. cell phones, notebook computers, etc.), electric vehicles (e.g. pure electric vehicles, hybrid electric vehicles, plug-in hybrid electric vehicles, electric bicycles, electric scooters, electric golf carts, electric trucks, etc.), electric trains, ships and satellites, and energy storage systems, etc.

As the electrical device, a secondary battery, a battery module, or a battery pack may be selected according to its usage requirements.

Figure 3:
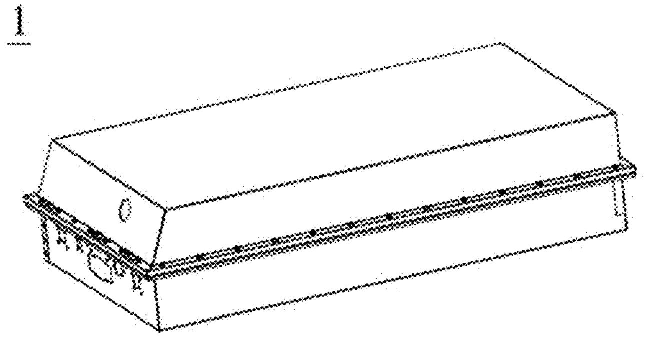
FIG. 3 is a schematic diagram of a battery pack according to an embodiment of the present disclosure.
Figure 4:
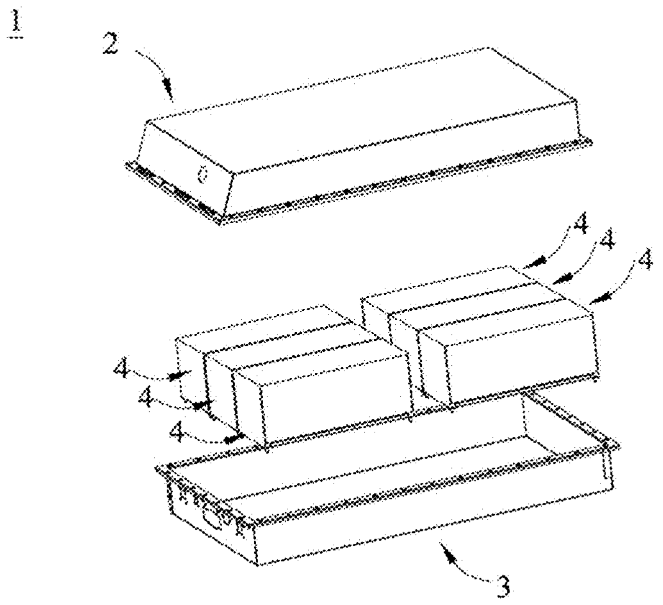
FIG. 4 is an exploded view of a battery pack of an embodiment of the present disclosure shown in FIG. 3.

FIGS. 3 and 4 shows a battery pack 1 as one example. Referring to FIGS. 3 and 4, the battery pack 1 may include a battery box and a plurality of battery modules 4 disposed in the battery box.

The battery box includes an upper box body 2 and a lower box body 3. The upper box body 2 can cover the lower box body 3 and form an enclosed space for accommodating the battery module 4. The plurality of battery modules 4 may be arranged in the battery box in an arbitrary manner.

Figure 5:
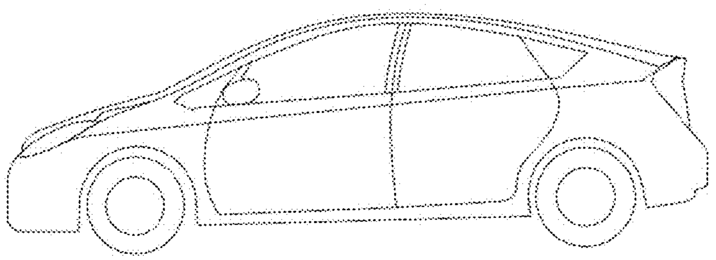
FIG. 5 is a schematic view of an electric device using a secondary battery as a power source according to an embodiment of the present disclosure.

FIG. 5 is an electrical device as an example. The electric device is a pure electric vehicle, a hybrid electric vehicle, or a plug-in hybrid electric vehicle. To meet the requirements of the electrical device for high power and high energy density of the secondary battery, a battery pack or battery module may be employed.

As another example, the device may be a cell phone, a tablet computer, a notebook computer, etc. The device is generally required to be light and thin. A secondary battery may be used as a power source.

EXAMPLES

Hereinafter, the present disclosure is specifically described based on examples, but it should be understood by those skilled in the art that the following examples are illustrative only and the present disclosure is not limited to these examples.

Further, in the Examples and Comparative Examples, the ratio, the solid content, the average particle diameter, the pH value, the molecular weight, and the degree of roll sticking, the peeling force, and the electrical conductivity of each monomer unit of the polymer of the present disclosure are measured and evaluated by the following methods.

Example 1

Preparation of Hydrophilic Polymer

In a 1000 ml pressurized reaction kettle, 0.2 parts by mass of sodium dodecyl sulfate as an emulsifier, 0.1 parts by mass of potassium persulfate as an initiator, and 150 parts by mass of distilled water as a dispersion medium were added and completely dissolved into a solution. Then, as a conjugated diene, 10 parts by mass of 1,3-butadiene was added, as a monoolefin, 90 parts by mass of styrene was added, as a hydrophilic monomer, 3 parts by mass of 3,4-dihydroxystyrene was added. It was stirred and heated at 0.6 Mpa, while the temperature was raised to 80° C., the reaction was maintained at this temperature for 6 hours to preform the polymerization. After completion of the reaction, the temperature was reduced to 25° C. and an emulsion of hydrophilic polymer was obtained by filtration through a filter screen. The emulsion solid content, the average particle size as determined using a Malven particle sizer, the pH as determined using a PHS-3C precision pH machine, and the molecular weight (polystyrene conversion) as determined using a GPC of the resulting hydrophilic polymer are shown in Table 1. The results of the peel force and the degree of roll sticking of the pole plates are also shown in Table 1.

It should be noted here that, it was confirmed by NMR measurement that the ratio of the monomers derived from each monomer in the resulting hydrophilic polymer is approximately the same as the input ratio.

Preparation of Negative Pole Plate 96 parts by mass of graphite as an anode active material, 0.9 parts by mass of conductive carbon black (SP) as a conductive agent, 1.5 parts by mass of carboxymethyl cellulose (CMC) as a thickener, 1.6 parts by mass of hydrophilic polymer prepared as described above, and an appropriate amount of deionized water were thoroughly mixed to obtain a slurry composition for a negative pole having a solid content of 54%.

The pure hydrophilic polymer extracted from the dispersion liquid may be added or a dispersion liquid of the hydrophilic polymer may be added when making the slurry composition. When the hydrophilic polymer was added in the form of a dispersion liquid, the added amount above was the mass when converted to pure hydrophilic polymer. Finally, the solid content of the anode slurry composition was adjusted by an appropriate amount of deionized water. From the viewpoint of simplicity of operation, it is preferable that the hydrophilic polymer dispersion liquid was used to prepare the above-mentioned slurry composition for a negative pole, either directly or after filtering through a sieve, after polymerizing the hydrophilic polymer.

The slurry was uniformly coated on the surface of a copper foil as a negative pole current collector in such a manner that the coating amount after drying reached 282 $mg/cm^2$, and dried in an oven at 90° C. to obtain an anode raw material on which a negative pole membrane sheet was formed on the current collector.

Then, the anode raw material was rolled in an environment at a temperature of 25° C. to obtain a negative pole plate. The peel strength (peeling force) of the negative pole plate thus obtained was measured in the following manner, and the degree of roll sticking was evaluated. The results are shown in Table 1.

<Test of Peel Strength>

In the peel strength test of the present disclosure, the negative pole plate obtained after the above rolling was first uniformly cut into 5 strips of test pieces having a longitudinal length of 100.0 mm±0.1 mm and a transverse width of 20.0 mm±0.1 mm. The surface of one side to be tested was bonded with the double-sided adhesive tape. The test surface was compacted with a 2 kg pressure roller to fully adhere the double-sided adhesive tape to the negative pole plate. The other side surface of double-sided adhesive tape was bonded to the surface of 4×15 cm 304 stainless steel plate. One end of the test piece was bent in a reverse direction. Then, one end of the stainless steel plate adhered with the pole plate was fixed to a lower fixture of an H-type tensile machine. The bent end of the test piece was fixed to an upper fixture. The angle of the test piece was adjusted, making the longitudinal axis of the stripped part of the test piece coincide with a line connecting the center of the upper and lower fixtures, and the tightness is suitable. Then, under the conditions of temperature 25±2° C. and relative humidity RH=65±5%, the test piece was stretched at the speed of 50 mm/min, until the test piece was completely peeled from the substrate. The displacement and acting force during the process was recorded, with the force when the force is balanced is taken as the peeling force of pole plate. The average value of 5 results was taken as the peel force.

<Evaluation of Roll Sticking Degree>

The degree of roll sticking in the preparation process of the negative pole plate was visually observed by 10 experts, and evaluated by the following three-level classification method. The average value of the evaluation was taken as the evaluation value of the degree of roll sticking.

◎: no or almost no roll-sticking observed

Δ: slight roll-sticking, but easy to peel off x: severe roll-sticking, unable to peel off

Preparation of Positive Pole Plate 95 parts by mass of lithium iron phosphate as a cathode active material, 2.5 parts by mass of commercially available carbon black as a conductive agent, and 2.5 parts by mass of commercially available polyvinylidene fluoride as a binder were mixed in a planetary mixer. The organic solvent N-methylpyrrolidone was then added and mixed under stirring at a temperature of 25±0.5° C. to obtain a slurry composition for the positive pole with a viscosity of 11,000 mPa s (measured by using a DV-2TLV Brookfield type viscometer at the temperature: 25±0.5° C., rotor: 64 #, rotor speed: measured under conditions of 12 rpm).

The obtained slurry composition for the positive pole was coated on an aluminum foil having a thickness of 13 m as a current collector in such a manner that the coating amount after drying reached 326±50 $mg/cm^2$. Drying in an oven at 125° C. to obtain a cathode raw material on which a cathode material layer is formed on a current collector.

Then, the cathode raw material was rolled in an environment at a temperature of 25° C. to obtain a positive pole plate.

Preparation of Separator

As the separator, a general polyethylene porous separator was provided.

Preparing of Lithium-Ion Battery

The above-mentioned negative pole plate, positive pole plate, and separator are laminated to obtain a battery cell. The battery cell was assembled into an outer package, filled with an electrolyte and encapsulated to obtain a lithium-ion battery. The battery performance was measured in the following manner, and the results were shown in Table 1.

<Test Method for Cyclic Performance of Secondary Battery at Normal Temperature>

The lithium-ion secondary ion batteries prepared in each example and comparative example were charged and discharged for the first time in an environment of 25° C., and charged to 3.65V at a constant current of 1 C and a constant voltage, left to stand for 5 min at the cutoff current 0.05 C, and then discharged at a constant current of 1 C to a lower cutoff voltage of 2.5V. The discharge capacity of the first cycle was recorded. The battery was subjected to 500 charge and discharge cycles as described above, and the discharge capacity of the $500^{th}$ cycle was recorded. The cycle capacity retention rate of the secondary battery was calculated.

$$\text{Cycle capacity retention(\%)} = (\text{discharge capacity of } 500^{th} \text{ cycle/discharge capacity of first cycle}) \times 100\%$$

Examples 2-46

A hydrophilic polymer, a slurry composition for a negative pole, a negative pole plate, a positive pole plate, a separator, and a lithium-ion battery were prepared in the same manner as in Example 1, except that the polymerization monomer ratio was changed as shown in Table 1. The evaluation was performed in the same manner as in Example 1. The results are shown in Table 1.

Comparative Example 1

96 parts by mass of graphite as an anode active material, 0.9 parts by mass of conductive carbon black (SP) as a conductive agent, 1.5 parts by mass of carboxymethyl cellulose (CMC) as a thickener, 1.6 parts by mass of SBR, and an appropriate amount of deionized water were thoroughly mixed to obtain a slurry composition for a negative pole having a solid content of 54%. Then, a negative pole plate, a positive pole plate, a separator, and a lithium-ion battery were prepared in the same manner as in Example 1. The evaluation was performed in the same manner as in Example 1. The results are shown in Table 1.

Comparative Example 2

A slurry composition for a negative pole, a negative pole plate, a positive pole plate, a separator, and a lithium-ion battery were prepared in the same manner as in Comparative Example 1, except that the thickener in Comparative Example 1 was replaced by a thickener made by mixing sodium carboxymethyl cellulose and highly substituted guar with a degree of substitution of 1.6 in a mass ratio of 1:3. The evaluation was performed in the same manner as in Example 1. The results are shown in Table 1.

Comparative Example 3

A slurry composition for a negative pole, a negative pole plate, a positive pole plate, a separator, and a lithium-ion battery were prepared by in the same manner as in Comparative Example 1, except that 1.6 parts by mass of a binder containing polymethacrylate-coated silica was used instead of the hydrophilic polymer of the present disclosure or the conventional SBR. The evaluation was performed in the same manner as in Example 1. The results are shown in Table 1.

TABLE 1

| | Conjugated diene | | Monoolefin | | Hydrophilic monomer | |
|---|---|---|---|---|---|---|
| | Monomer | Added amount (parts by mass) | Monomer | Added amount (parts by mass) | Monomer | Added amount (parts by mass) |
| Example 1 | 1,3-butadiene | 10 | Styrene | 90 | 3,4-dihydroxy-styrene | 3 |
| Example 2 | | 30 | | 70 | | 3 |
| Example 3 | | 70 | | 30 | | 3 |
| Example 4 | | 90 | | 10 | | 3 |
| Example 5 | | 10 | | 90 | | 1 |
| Example 6 | | 30 | | 70 | | 1 |
| Example 7 | | 10 | | 90 | | 4 |
| Example 8 | | 30 | | 70 | | 4 |
| Example 9 | | 10 | | 90 | | 6 |
| Example 10 | | 30 | | 70 | | 6 |
| Example 11 | | 10 | | 90 | 3,5-dihydroxy-styrene | 3 |
| Example 12 | | 10 | | 90 | 4-hydroxystyrene | 3 |
| Example 13 | | 10 | | 90 | 3-hydroxystyrene | 3 |
| Example 14 | | 10 | | 90 | 5-vinyl-1,2,3-benzenetriol | 3 |
| Example 15 | | 10 | | 90 | 4-vinyl-1,2-phenylenediamine | 3 |
| Example 16 | | 10 | | 90 | 5-vinyl-1,3-phenylenediamine | 3 |
| Example 17 | | 10 | | 90 | 4-vinylaniline | 3 |
| Example 18 | | 10 | | 90 | 3-vinylaniline | 3 |
| Example 19 | | 10 | | 90 | 4-vinyl-1,2-benzenedicarboxylic acid | 3 |
| Example 20 | | 10 | | 90 | 5-vinyl-1,3-benzenedicarboxylic acid | 3 |
| Example 21 | | 10 | | 90 | 4-vinylbenzoic acid | 3 |
| Example 22 | | 10 | | 90 | 5-vinyl-1,2,3-benzenetricarboxylic acid | 3 |
| Example 23 | | 10 | | 90 | 4-(propen-1-yl)-1,2-benzenediol | 3 |
| Example 24 | | 10 | | 90 | 4-(propen-2-yl)-1,2-benzenediol | 3 |

TABLE 1-continued

| | | | | | | |
|---|---|---|---|---|---|---|
| Example 25 | | 10 | | 90 | 4-(buten-1-yl)-1,2-benzenediol | 3 |
| Example 26 | | 10 | | 90 | 4-(buten-2-yl)-1,2-benzenediol | 3 |
| Example 27 | | 10 | | 90 | 4-vinyl-2-aminophenol | 3 |
| Example 28 | | 10 | | 90 | 4-vinylsalicylic acid | 3 |
| Example 29 | | 10 | | 90 | 4-vinyl-2-aminobenzoic acid | 3 |
| Example 30 | | 10 | α-methyl styrene | 90 | 3,4-dihydroxy-styrene | 3 |
| Example 31 | | 10 | p-tert-butylstyrene | 90 | | 3 |
| Example 32 | | 10 | butoxystyrene | 90 | | 3 |
| Example 33 | | 10 | chlorostyrene | 90 | | 3 |
| Example 34 | | 10 | vinylnaphthalene | 90 | | 3 |
| Example 35 | | 10 | Acrylic acid | 90 | | 3 |
| Example 36 | | 10 | butyl methacrylate | 90 | | 3 |
| Example 37 | | 10 | vinyl chloride | 90 | | 3 |
| Example 38 | | 10 | oleic acid | 90 | | 3 |
| Example 39 | | 10 | vinyl acetate | 90 | | 3 |
| Example 40 | | 10 | Acrylonitrile | 90 | | 3 |
| Example 41 | isoprene | 10 | Styrene | 90 | 3,4-dihydroxy-styrene | 3 |
| Example 42 | 2,3 dimethyl-1,3-butadiene | 10 | | 90 | | 3 |
| Example 43 | 1,3-pentadiene | 10 | | 90 | | 3 |
| Example 44 | 2,4-hexadiene | 10 | | 90 | | 3 |
| Example 45 | 1,3-cyclohexadiene | 10 | | 90 | | 3 |
| Example 46 | 2-chloro-1,3-butadiene | 10 | | 90 | | 3 |
| Comparative Example 1 | Conventional SBR used as binder | | | | | |
| Comparative Example 2 | Conventional SBR used as binder | | | | | |
| Comparative Example 3 | Polymethacrylate coated silica used as binder | | | | | |

| | Average particle size (nm) | pH value | Molecular weight Mn ($\times10^4$) | Roll sticking degree | Peel force (N/m) | Cycle capacity rate of secondary lithium battery at 25° C. |
|---|---|---|---|---|---|---|
| Example 1 | 152 | 8.96 | 13.13 | ⊚ | 18.35 | 96.11% |
| Example 2 | 155 | 8.67 | 12.94 | ⊚ | 17.48 | 95.57% |
| Example 3 | 153 | 8.55 | 13.26 | Δ | 14.59 | 94.48% |
| Example 4 | 182 | 8.85 | 12.79 | Δ | 14.64 | 94.56% |
| Example 5 | 190 | 8.75 | 12.78 | Δ | 14.36 | 94.53% |
| Example 6 | 166 | 8.75 | 12.55 | Δ | 14.28 | 94.47% |
| Example 7 | 168 | 8.59 | 16.15 | ⊚ | 17.65 | 95.67% |
| Example 8 | 167 | 8.84 | 15.65 | ⊚ | 16.56 | 95.30% |
| Example 9 | 152 | 8.84 | 13.97 | ⊚ | 18.08 | 95.94% |
| Example 10 | 183 | 8.86 | 12.90 | ⊚ | 17.34 | 95.32% |
| Example 11 | 162 | 8.80 | 12.96 | ⊚ | 18.12 | 96.03% |
| Example 12 | 171 | 8.63 | 14.76 | Δ | 14.24 | 94.39% |
| Example 13 | 157 | 8.80 | 15.16 | Δ | 14.22 | 94.38% |
| Example 14 | 179 | 8.60 | 12.71 | Δ | 14.62 | 94.56% |
| Example 15 | 177 | 8.73 | 13.13 | Δ | 14.85 | 94.66% |
| Example 16 | 188 | 8.75 | 12.20 | Δ | 14.35 | 94.36% |
| Example 17 | 154 | 8.59 | 15.37 | Δ | 14.80 | 94.61% |
| Example 18 | 176 | 8.58 | 14.65 | Δ | 14.84 | 94.63% |
| Example 19 | 189 | 8.64 | 12.93 | Δ | 14.94 | 94.79% |
| Example 20 | 170 | 8.63 | 14.92 | Δ | 14.83 | 94.61% |
| Example 21 | 192 | 8.61 | 13.44 | Δ | 14.34 | 94.28% |
| Example 22 | 190 | 8.79 | 14.20 | Δ | 14.92 | 94.75% |
| Example 23 | 175 | 8.56 | 15.66 | ⊚ | 17.73 | 95.70% |
| Example 24 | 163 | 8.63 | 14.45 | ⊚ | 17.48 | 95.43% |
| Example 25 | 174 | 8.67 | 15.87 | ⊚ | 17.58 | 95.65% |
| Example 26 | 171 | 8.82 | 13.95 | ⊚ | 17.85 | 95.81% |
| Example 27 | 187 | 8.67 | 15.17 | Δ | 14.28 | 94.13% |
| Example 28 | 179 | 8.78 | 15.38 | Δ | 14.44 | 94.42% |
| Example 29 | 170 | 8.86 | 16.14 | Δ | 14.39 | 94.37% |
| Example 30 | 155 | 8.75 | 15.87 | Δ | 15.34 | 94.90% |
| Example 31 | 186 | 8.70 | 14.91 | Δ | 15.41 | 94.98% |
| Example 32 | 170 | 8.77 | 12.74 | Δ | 15.80 | 95.26% |
| Example 33 | 153 | 8.86 | 16.94 | Δ | 14.45 | 94.44% |
| Example 34 | 170 | 8.62 | 12.77 | Δ | 15.74 | 95.13% |
| Example 35 | 156 | 8.74 | 13.40 | Δ | 15.62 | 95.08% |
| Example 36 | 160 | 8.86 | 15.36 | Δ | 15.35 | 94.97% |
| Example 37 | 194 | 8.60 | 12.86 | Δ | 15.31 | 94.86% |

TABLE 1-continued

| | | | | | | |
|---|---|---|---|---|---|---|
| Example 38 | 178 | 8.56 | 15.73 | Δ | 15.01 | 94.85% |
| Example 39 | 158 | 8.82 | 14.40 | Δ | 14.68 | 94.57% |
| Example 40 | 205 | 8.77 | 15.61 | ◎ | 16.89 | 95.42% |
| Example 41 | 204 | 8.56 | 14.58 | ◎ | 17.78 | 95.76% |
| Example 42 | 190 | 8.72 | 14.23 | ◎ | 18.12 | 96.00% |
| Example 43 | 186 | 8.64 | 13.82 | ◎ | 18.02 | 95.84% |
| Example 44 | 157 | 8.77 | 13.79 | ◎ | 16.86 | 95.41% |
| Example 45 | 168 | 8.77 | 14.23 | Δ | 14.84 | 94.62% |
| Example 46 | 205 | 8.86 | 14.41 | Δ | 14.68 | 94.57% |
| Comparative Example 1 | 180 | | | X | 12.05 | 94.04% |
| Comparative Example 2 | 180 | | | Δ | 13.45 | 94.11% |
| Comparative Example 3 | | | | X | 10.21 | 94.02% |

According to the results in Table 1 above, it can be seen that, the hydrophilic polymer of the present disclosure is used to prepare the binder for the negative pole and the anode slurry, which can inhibit the problem of floating in the binder system and roll sticking of the negative pole plate during rolling, and obtain a lithium ion battery having performance equivalent to or even better than that of the prior art while improving the bonding force between the active material and the current collector.

It should be noted that the present disclosure is not limited to the above-mentioned embodiments. The above-mentioned embodiments are merely examples. The embodiments having substantially the same constitution and exerting the same function and effect as the technical idea within the scope of the technical solution of the present disclosure are all included within the technical scope of the present disclosure. In addition, without departing from the spirit of the present disclosure, various modifications made to the embodiments by those skilled in the art and other embodiments that are constructed by combining some of the constituent elements of the embodiments are also included in the scope of the present disclosure.

What is claimed is:

1. A hydrophilic polymer, wherein the hydrophilic polymer is a copolymer of a conjugated diene, a monoolefin and a hydrophilic monomer represented by Formula I, Formula I

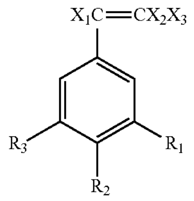

where $X_1$ and $X_2$ are hydrogen atoms, and $X_3$ is selected from alkyls with 1-4 carbon atoms;

at least one of $R_1$, $R_2$ and $R_3$ is hydrophilic group; and others are each independently selected from hydrogen atoms, or an alkyl or alkoxy with 1-4 carbon atoms.

2. The hydrophilic polymer according to claim 1, wherein the copolymer is a random copolymer;

the conjugated diene is a conjugated diene with 4 or more carbon atoms, and selected from one or more of 1,3-butadiene, isoprene, 2,3-dimethyl-1,3-butadiene, 1,3-pentadiene, 2,4-hexadiene, 1, 3-cyclohexadiene, 2-chloro-1,3-butadiene, and/or the monoolefin is an aromatic monovinyl compound, and selected from one or more of styrene, α-methylstyrene, p-tert-butylstyrene, butoxystyrene, vinyltoluene, chlorostyrene, and vinylnaphthalene.

3. The hydrophilic polymer according to claim 1, wherein the hydrophilic group is selected from at least one of a hydroxyl, an amino, and a carboxyl.

4. The hydrophilic polymer according to claim 1, wherein at least two of $R_1$, $R_2$ and $R_3$ are hydrophilic groups and others are each independently selected from hydrogen atoms, or alkyl with 1-4 carbon atoms.

5. The hydrophilic polymer according to claim 1, wherein a number average molecular weight Mn thereof is $12\times10^4$-$17\times10^4$.

6. The hydrophilic polymer according to claim 1, wherein in the hydrophilic polymer, a ratio of parts by mass of the conjugated diene, the monoolefin, and the hydrophilic monomer is 10-90:90-10:1-6.

7. A method for preparing a hydrophilic polymer, comprising a step of polymerizing a conjugated diene, a monoolefin, and a hydrophilic monomer represented by Formula I, Formula I

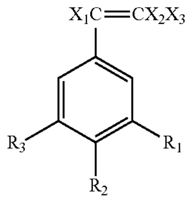

where $X_1$ and $X_2$ are hydrogen atoms, and $X_3$ is selected from alkyls with 1-4 carbon atoms;

at least one of the $R_1$, $R_2$ and $R_3$ is hydrophilic group; and others are each independently selected from hydrogen atoms, or an alkyl or alkoxy with 1-4 carbon atoms.

8. The method for preparing a hydrophilic polymer according to claim 7, wherein a copolymer is a random copolymer;

the conjugated diene is a conjugated diene with 4 or more carbon atoms, and selected from one or more of 1,3-butadiene, isoprene, 2,3-dimethyl-1,3-butadiene, 1,3-pentadiene, 2,4-hexadiene, 1, 3-cyclohexadiene, 2-chloro-1,3-butadiene and/or the monoolefin is an aromatic monovinyl compound, and selected from one or more of styrene, α-methylstyrene, p-tert-butylstyrene, butoxystyrene, vinyltoluene, chlorostyrene, and vinylnaphthalene.

9. The method for preparing a hydrophilic polymer according to claim 7, wherein the hydrophilic group is selected from at least one of a hydroxyl, an amino, and a carboxyl.

10. The method for preparing a hydrophilic polymer according to claim 7, wherein at least two of $R_1$, $R_2$ and $R_3$ are hydrophilic groups, and others are each independently selected from hydrogen atoms, or an alkyl with 1-4 carbon atoms.

11. The method for preparing a hydrophilic polymer according to claim 7, wherein a number average molecular weight Mn thereof is $12\times10^4$-$17\times10^4$.

12. The method for preparing a hydrophilic polymer according to claim 7, wherein in the hydrophilic polymer, a ratio of parts by mass of the conjugated diene, the monoolefin, and the hydrophilic monomer is 10-90:90-10:1-6.

13. An electrode active material slurry, comprising an electrode active material, a dispersion medium, and the hydrophilic polymer according to claim 1.

14. A lithium ion secondary battery, wherein the lithium ion secondary battery comprises a positive pole plate, a negative pole plate, a separator and an electrolyte; wherein the negative pole plate comprises a negative pole membrane layer prepared from the electrode active material slurry according to claim 13.

15. A battery pack, wherein the battery pack comprises the lithium ion secondary battery according to claim 14.

16. An electrical device, wherein the electrical device comprises the lithium ion secondary battery according to claim 14.

* * * * *